US012436791B2

(12) United States Patent
Tsirkin (10) Patent No.: US 12,436,791 B2
(45) Date of Patent: Oct. 7, 2025

(54) EFFICIENT NETWORK DEVICE FAILOVER MANAGEMENT FOR VIRTUAL MACHINES

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 599 days.

(21) Appl. No.: 17/852,200

(22) Filed: Jun. 28, 2022

(65) Prior Publication Data

US 2023/0418648 A1    Dec. 28, 2023

(51) Int. Cl.
*G06F 9/455*    (2018.01)

(52) U.S. Cl.
CPC ...... *G06F 9/45558* (2013.01); *G06F 9/45545* (2013.01); *G06F 2009/45583* (2013.01); *G06F 2009/45595* (2013.01)

(58) Field of Classification Search
CPC ............. G06F 9/45558; G06F 9/45545; G06F 2009/45583; G06F 2009/45595
See application file for complete search history.

(56) References Cited

U.S. PATENT DOCUMENTS

| 8,266,275 | B2 | 9/2012 | Xu et al. |
| 8,285,881 | B2 | 10/2012 | Elzur |
| 8,842,518 | B2 | 9/2014 | Johnsen |
| 9,253,245 | B2 | 2/2016 | Wood et al. |
| 9,858,102 | B2 | 1/2018 | Khemani et al. |
| 10,264,020 | B1* | 4/2019 | Nanda ..................... H04L 43/04 |
| 2013/0145072 | A1* | 6/2013 | Venkataraghavan ... G06F 13/12 709/200 |
| 2015/0078152 | A1 | 3/2015 | Garg et al. |
| 2015/0339144 | A1* | 11/2015 | Cao ..................... G06F 9/45558 718/1 |
| 2017/0195192 | A1* | 7/2017 | Hanson ............... H04L 43/0876 |
| 2017/0346686 | A1* | 11/2017 | Mudigonda ......... H04L 61/5084 |
| 2022/0182318 | A1* | 6/2022 | Shilimkar ........... H04L 61/5007 |

OTHER PUBLICATIONS

Red Hat, Inc., "Virtual Network Interface Cards (VNICS)", Red Hat Customer Portal, 10 pages, 2022.
https://lore.kernel.org/all/20211107031702-mutt-send-email-mst@kernel.org/, webpage accessed Jun. 28, 2022, 3 pages.

* cited by examiner

*Primary Examiner* — Dong U Kim
(74) *Attorney, Agent, or Firm* — Womble Bond Dickinson (US) LLP (57) ABSTRACT

Systems and methods for virtual machine networking can include detecting, by a virtual machine (VM), a primary virtual Network Interface Controller (vNIC) configured with a first media access control (MAC) address assigned to the VM by a hypervisor running on a host computer system, and detecting a standby vNIC configured with a second MAC address. They can further include binding a software Network Interface Controller (NIC) configured with a third MAC address to the primary vNIC and the standby vNIC, and selecting a vNIC from among those two vNICs for use by the software NIC for communicating network data packets. Additionally, they can include assigning the third MAC address to the selected vNIC, and communicating network data packets through the software NIC using the third MAC address.

20 Claims, 6 Drawing Sheets

Detecting, by a virtual machine (VM), a primary virtual Network Interface Controller (vNIC) configured with a first media access control (MAC) address assigned to the VM by a hypervisor running on a host computer system  202

Detecting, by the VM, a standby vNIC configured with a second MAC address 204

Binding a software Network Interface Controller (NIC) configured with a third MAC address to the primary vNIC and the standby vNIC 206

Selecting a vNIC from a group comprising the primary vNIC and the standby vNIC for use by the software NIC for communicating network data packets 208

Assigning the third MAC address to the selected vNIC 210

Communicating network data packets through the software NIC using the third MAC address 212

EFFICIENT NETWORK DEVICE FAILOVER MANAGEMENT FOR VIRTUAL MACHINES

TECHNICAL FIELD

The disclosure is generally related to virtualization systems, and is more specifically related to virtual machine networking.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine", and the operating system of the host machine is typically referred to as the "host operating system". A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Implementations of the disclosure are directed to mechanisms for managing networking within a virtualized environment.

Various processor architectures support virtualization by providing instructions for facilitating virtual machine execution. In certain implementations, a processor can support executing a hypervisor (also referred to as "virtual machine monitor") that can have complete control of various hardware resources of a host machine including the processor. A hypervisor can present a virtual machine with seamless interfaces of one or more virtual processors as well as other virtual devices, such that the virtual machine, in most situations, would not be able to distinguish those devices from physical devices. By controlling such interfaces, the hypervisor can retain selective control of processor resources, physical memory, interrupt management, input/output (I/O), and networking. Each virtual machine (VM) is a guest software environment that can support a stack that includes operating system (OS) and application software. Each VM can operate independently of other VMs and can use the same interface to the processors, memory, storage, graphics, and I/O provided by the physical platform (i.e., host machine). The software executing in a virtual machine can be executed at the reduced privilege level so that the hypervisor can retain control of platform resources.

Communication between VMs or from a VM to an external network can be performed using virtual network interface controllers (vNICs) and virtual switches and/or network bridges. A vNIC is a seamless interface for a physical network interface card, which allows a virtual machine to communicate with other networked devices (e.g., using specific physical layer and data link layer standards). A virtual switch is a software-based implementation of a network switch, which is utilized for performing the data link layer frame routing and/or network layer packet routing between network nodes. In some implementations, vNICs can be connected to virtual ports of a virtual switch. A network bridge can perform forwarding of network layer packets between two separate network segments. Thus, a VM can use one or more vNICs, virtual switches, and/or bridges to connect to a physical network through the host physical network interface controller (NIC).

Some physical NICs have partitioning functionality that enables a single physical network interface port to appear to a host machine (or a VM running on the host machine) as multiple network device functions. For example, a physical NIC can be represented by multiple uniquely identified physical functions where each function appears as a separate NIC port. Each physical function and its corresponding representation as a distinct NIC port can be referred to as a NIC partition and be associated with a different vNIC. Accordingly, in some systems a vNIC of a VM can be mapped directly to a physical NIC of a host machine (e.g., by having a partition of the physical NIC assigned exclusively to the VM) such that the data packets being transmitted to and from the vNIC are directly transmitted to and from the physical NIC. Conversely, the vNIC of a VM can be linked to the physical NIC only through the mediation of the hypervisor and/or a host machine's OS that passes the data packets to and from the vNIC. Many systems support exposing multiple vNICs to a VM and having some vNICs being directly mapped to a corresponding physical NIC while other vNICs communicate only through the hypervisor.

In some systems, a VM can run a software application that performs all the functions of a NIC and can be virtually connected to one or more vNICs to control their operation. Such a software application, referred to as a "software NIC" herein, can appear to an operating system (e.g., a guest OS of a VM) as a standalone or additional NIC which can be used for communicating network data packets. In such systems, two vNICs of a VM, a primary vNIC and a standby vNIC, each having the same Media Access Control (MAC) address, can be connected together via the software NIC created by the VM to implement failover mechanisms to increase redundancy and reliability of the network connection for the VM. In some systems, the vNICs can be connected together by each being associated with the software NIC through a software interface of the guest OS. In such situations, the VM can assign, to the software NIC, the MAC address of the primary NIC or the MAC address of the standby vNICs, and use the software NIC as its sole NIC. The software NIC then determines how to communicate the network traffic and which of the bound vNICs to use in doing so (i.e., which vNIC to use to transmit or receive network data packets). This permits one of the vNICs (i.e., the standby vNIC) to act as a failover vNIC in situations where the other vNIC (i.e., the primary vNIC) is subject to a condition that disrupts its operation (e.g., is disabled, gets damaged, disconnected, etc.). A failover device can be a redundant device, in a set of similar devices, which can take over the functions of one of the other devices in the set if the other device becomes disabled, disconnected, or otherwise incapable of performing its functions. Accordingly, failover functionality allows moving or switching to a backup or standby device from a primary device when the primary device fails.

However, some guest OSs that run on VMs may not be able to properly direct network traffic when presented with multiple network interface controllers sharing the same MAC address. Accordingly, such guest OSs cannot take advantage of the failover functionality of the software NIC and direct the receipt and transmission of network data to the appropriate vNIC. Furthermore, since a vNIC that has its communication mediated by a hypervisor can also ultimately have its network data traffic passed through the physical NIC, the physical NIC can be receiving and transmitting data packets to either the primary or the standby NIC. Accordingly if a VM is configured with a pair of vNICs, a primary vNIC and a standby vNIC, when such a guest OS attempts to use both of them, the driver of the physical NIC may not always correctly determine to which vNIC to direct incoming data packets. Addressing these issues may require costly hardware updates or use of different OSs. Thus, inability to take full advantage of failover functionality may reduce the reliability and uptime of network connections of the VM systems.

Aspects of the present disclosure address the above-noted and other deficiencies by providing mechanisms through which a hypervisor exposes, to a VM, a primary vNIC and a secondary vNIC, each configured with its own MAC addresses. In some implementations, the guest OS of the VM can create a software NIC that is assigned a MAC address that can be the same as the MAC address of one of the vNICs or can be an entirely different MAC address. The software NIC can then be used by the VM to control network traffic and select one of the vNICs to communicate network data packets by assigning the software NICs MAC address to the selected vNIC. Consequently, the guest OS of the VM can switch to the other vNIC by assigning the software NIC's MAC address to the other vNIC and reverting the MAC address of the previously selected vNIC (i.e., reassigning, to the previously selected vNIC, its original MAC address). In some implementations, the hypervisor can detect the assignment of MAC addresses to the vNICs and any updates or changes to their assigned MAC addresses and notify the physical NIC accordingly such that it transmits/receives network data packets to the vNIC that is assigned the MAC address of the software NIC. In this manner, both the primary vNIC and the standby vNIC are available for use by the VM through the software NIC with their respective MAC addresses without ambiguity regarding the MAC address that the physical NIC should use to communicate network data packets with the VM. Accordingly, the implementations of the present disclosure enable failover functionality and improve connection reliability for VMs with guest OSs that may not natively support multiple vNICs having identical MAC addresses. Further, the various implementations described in more detail below improve the interoperability of physical NICs and VMs by specifying a unique MAC address for communicating network data packets with the VM.

Various aspects of the above referenced methods and systems are described in details herein below by way of examples, rather than by way of limitation. The examples provided below discuss a virtualized computer system where managing network devices for virtual machines may be initiated by aspects of a hypervisor, by a host operating system, by a virtual machine, by a virtual machine operating system, or by a combination thereof. In other examples, managing VM network devices and traffic may be performed in computer system that is absent a hypervisor or other virtualization features discussed below. These and other benefits of the implementations of the present disclosure can be understood in more detail with reference to FIG. 1.

Figure 1:
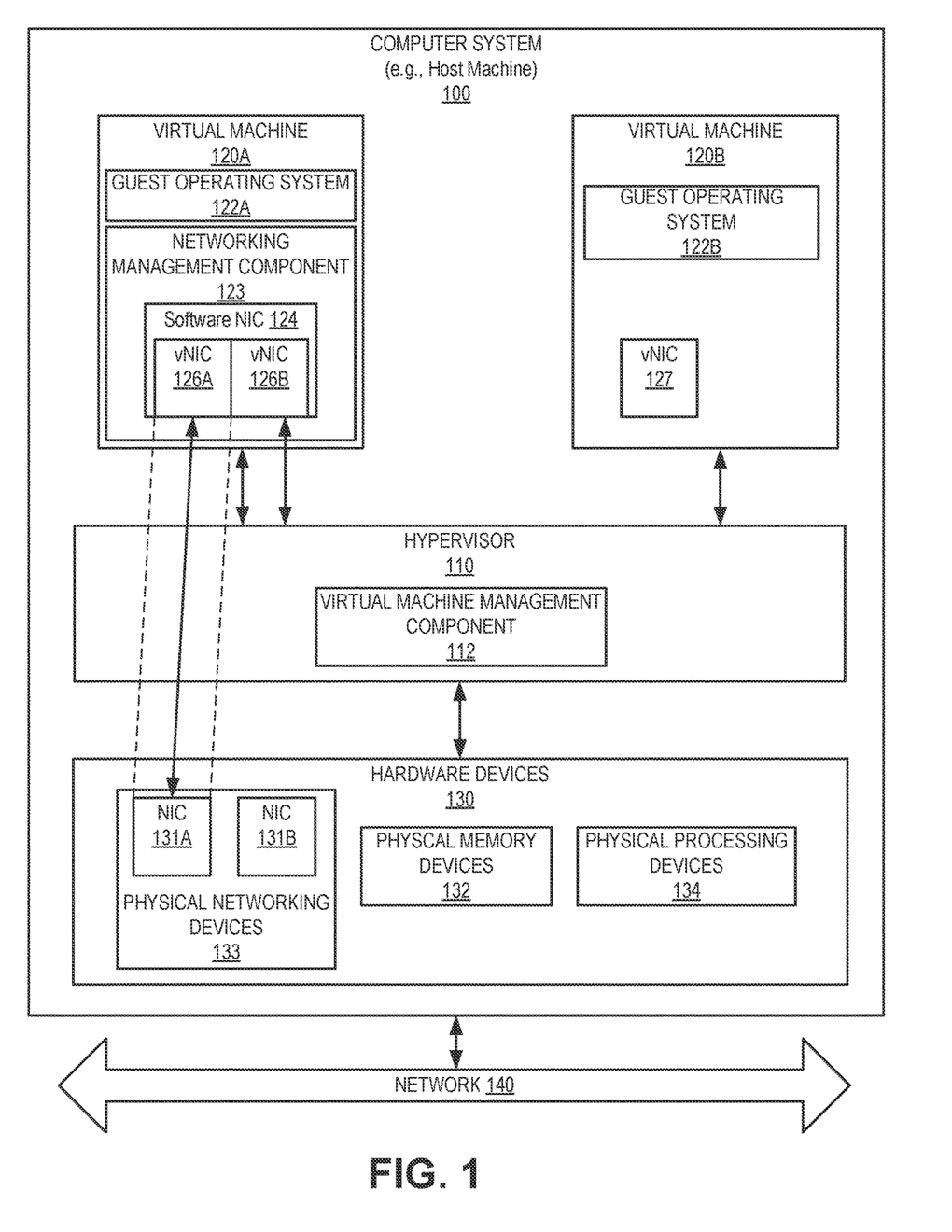
FIG. 1 depicts a high-level diagram of an example system architecture operating in accordance with one or more implementations of the present disclosure.

FIG. 1 depicts an illustrative architecture of a computer system 100, in accordance with an implementation of the present disclosure. It should be noted that other architectures for computer system 100 are possible, and that the implementation of a computer system utilizing embodiments of the disclosure are not necessarily limited to the specific architecture depicted. Computer system 100 can be a single host machine or multiple host machines that may be arranged in a homogenous or non-homogenous group (e.g., cluster system, grid system, or distributed system). Computer system 100 can include a rackmount server, a workstation, a desktop computer, a notebook computer, a tablet computer, a mobile phone, a palm-sized computing device, a personal digital assistant (PDA), etc. In the implementation depicted in FIG. 1, computer system 100 can include hypervisor 110, virtual machines 120A-B, hardware devices 130, and network 140.

The computer system 100 can provide operating system level virtualization by running a computer program that provides computing resources to one or more VMs 120A-B. Operating system level virtualization can be implemented within the hypervisor 110 and can facilitate the isolation of VMs from one another. In one implementation, operating system level virtualization may not require hardware support and may impose little to no overhead because programs within each of the VMs may use the underlying hypervisor 110 to execute system calls. This may enable the computer system 100 to provide virtualization without the need to provide hardware emulation or be run in an intermediate virtual machine as may occur with hardware level virtualization. Operating system level virtualization may provide resource management features that isolate or limit the impact of one VM or another.

The operating system level virtualization can provide a pool of computing resources that are accessible by VM 120A but are isolated from one or more other VMs. The pool of resources can include file system resources (e.g., particular volumes), network resources (e.g., particular network interfaces, sockets, addresses, or ports), memory resources (e.g., particular memory portions), other computing resources, or a combination thereof. The operating system level virtualization can also limit (e.g., isolate) a VM's access to one or more computing resources by monitoring the VM's activity and restricting the activity based on one or more predetermined limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Hypervisor 110 can provide VMs 120A-B with access to computing resources. For example, a VM 120A-B may be associated with various I/O devices, such as disk drive controllers, graphics cards, network interface cards, sound cards, etc. In some implementations, the hypervisor 110 may support a passthrough mode for assigning I/O devices to virtual machines, in accordance with certain virtualization specifications, which use physical function (PFs) and virtual functions (VFs). As used herein, physical functions are full-featured Peripheral Component Interconnect Express (PCIe) devices that may include all configuration resources and capabilities of a particular I/O device. Virtual functions are "lightweight" PCIe functions that contain the resources necessary for data movement, but may have a minimized set of configuration resources. Thus, an I/O device associated with a virtual machine (e.g., a virtual network interface card (vNIC) 126A-B) may be provided by a virtual function, thus bypassing the virtual networking on the host machine (e.g., computer system 100) in order to reduce the latency between the VM 120A-B and the underlying physical I/O device.

Device virtualization may be implemented by intercepting virtual machine memory read/write and/or input/output (I/O) operations with respect to certain memory and/or I/O port ranges, and by routing hardware interrupts to a VM 120A-B associated with the corresponding virtual device. In certain implementations, hypervisor 110 may support certain specifications permitting the sharing of single physical device by two or more virtual machines. Some such specifications can enable a single root function (e.g., a single Ethernet port) to appear to VMs 120A-B as multiple physical devices. Thus, a physical I/O device with such capabilities may be configured to appear in the PCI configuration space as multiple functions. Some of these specifications can support physical functions and virtual functions. Physical functions are full PCIe devices that may be discovered, managed, and configured as normal PCI devices. Physical functions can configure and manage the sharing enabling functionality by assigning virtual functions. Virtual functions can be simple PCIe functions that only process I/O. Each virtual function can be derived from a corresponding physical function.

For example, the hypervisor 110 can assign one or more virtual functions to a virtual machine, by mapping the configuration space of each virtual function to the guest memory address range associated with the virtual machine. In some implementations, each virtual function may only be assigned to a single virtual machine, as virtual functions require real hardware resources. A virtual machine may have multiple virtual functions assigned to it. A virtual function appears as a network card in the same way as a normal network card would appear to an operating system.

The hypervisor 110 (e.g., via a VM management component 112) can create VMs 120A-B and expose one or more virtual hardware devices to the VMs. In some implementations, a peripheral device, such as a NIC, can be made available to a VM 120A-B by mapping the address ranges of the configuration space and memory buffers of the virtual network interface controllers (vNICs) 126A-B, 127 to the address space of the VM 120A-B. For example, the hypervisor 110 can execute VMs 120A-B with respective vNICs 126A-B, 127 (e.g., by mapping the aforementioned address ranges to the corresponding memory space of the VM to provide access to corresponding hardware resource abstractions) to enable them to transmit and receive data (e.g., network data packets).

Each of the VMs 120A-B can represent an isolated execution environment implemented by computer system 100. Each of VMs 120A-B may appear to be as a standalone instance of the user space of an operating system (not shown) of the computer system 100.

VMs 120A-B can execute guest executable code that can use an underlying emulation of the physical resources. The guest executable code may include a guest operating system (OS) 122A-B, guest applications, guest device drivers, etc. Each of the VMs 120A-B can support hardware emulation, full virtualization, para-virtualization, operating system-level virtualization, or a combination thereof. VMs 120A-B can have the same or different types of guest operating systems. VMs 120A-B can execute guest operating systems 122A-B and networking management component 123 to manage vNICs 126A-B, 127A.

Each VM can be allocated guest memory (not shown) which can be any virtual memory, logical memory, physical memory, other portion of memory, or a combination thereof for storing data. Guest memory can represent the portion of memory that is allocated by hypervisor 110 for use by one or more respective VMs 120A-B. Guest memory can be managed by guest operating system 122A-B. The hypervisor 110 can have hypervisor memory (not shown) allocated for hypervisor operations that can be the same or similar to the guest memory but can be managed by hypervisor 110 instead of a guest operating system. The memory allocated to VMs 120A-B can be a portion of hypervisor memory that has been allocated by hypervisor 110 to VMs 120A-B and can correspond to guest memory of VMs 120A-B. In some implementations a portion of the guest memory of VM 120A can be allocated to VM 120B or to one or more of its virtual devices (e.g., vNICs 126A-B). Other portions of hypervisor memory may be allocated for use by hypervisor 110, a host operating system, hardware device, other module, or a combination thereof.

Hypervisor 110 can also be known as a virtual machine monitor (VMM) and can provide VMs 120A-B with access to one or more features of the underlying hardware devices 130 including physical memory devices 132, physical networking devices 133, and physical processing devices 134. In the example shown, hypervisor 110 can run directly on the hardware of computer system 100 (e.g., bare metal hypervisor). In other examples, hypervisor 110 can run on or within a host operating system (not shown). Hypervisor 110 can manage system resources, including access to hardware devices 130, and may manage execution of VMs 120A-B on a host machine (e.g., computer system 100). This includes provisioning resources of a physical central processing unit ("CPU") to each VM 120A-B running on the host machine. Software executing in VMs 120A-B may operate with reduced privileges such that hypervisor 110 retains control over resources. In some implementations, hypervisor 110 can retain selective control of the processor resources, physical memory, interrupt management, networking, and input/output ("I/O"). In the example shown, hypervisor 110 can include a VM management component 112. The VM management component 112 may can create and manage VMs 120A-B. The VM management component 112 can be a software component implemented by one or more software modules, each module associated with a set of executable instructions. Furthermore, the VM management component 112 can be purely functional (i.e., VM management component 112 can be an integral part of the executable code of hypervisor 110).

The VM Management component 112 of hypervisor 110 can (e.g., by using VM management component 112) create vNICs 126A-B, 127 and expose them respectively to VM 120A and VM 120B. In some implementations, the VM management component 112 can create VM 120B responsive to a request being sent to the hypervisor 110. Further, the VM management component 112 can create and configure each VM 120A-B with one or more virtual network interface controllers (vNICs) 126A-B, 127A. Thus, in some implementations, the hypervisor 110 can provide access to vNIC 126A (also referred to as a "primary vNIC") and to vNIC 126B (also referred to as a "standby vNIC") to VM 120A, which can manage them using the networking management component 123. The networking management component 123 can be a software component implemented by one or more software modules, each module associated with a set of executable instructions. Furthermore, the networking management component 123 can be purely functional (i.e., networking management component 123 can be an integral part of the executable code of VM 120A). In some implementations, the networking management component 123 can be a component of guest operating system 122A.

As explained in more detail below, in some implementations, the VM 120A can use the networking management component 123 to execute software application (i.e., software NIC 124) that performs all the functions of a NIC for connecting and managing the vNICs 126A-B. The networking management component 123 can identify each of the vNICs as either a primary vNIC 126A or a standby vNIC 126B to be controlled by the software NIC 124 as a failover pair of devices. The software NIC 124 can forward network data packets for VM 120A. In some implementations, the software NIC 124 can control the operation of the primary vNIC 126A and standby vNIC 126B by selecting one or both of the vNICs for the transmission and receipt of network data packets on behalf of the VM 120A. Accordingly, the software NIC 124, can manage the primary vNIC 126A and standby vNIC 126B as a pair of vNICs that act as failover devices for one another when a loss of functionality is experienced. For example, if one of the vNICs (e.g., the primary vNIC 126A) becomes disconnected and is unable to transmit and/or receive network data packets, the connection of the two vNICs as a failover pair of devices within the software NIC 124 enables the software NIC 124 to switch to the standby vNIC 126B for communicating network data packets without any loss of functionality from the perspective of the VM 120A. For some guest OSs 122A, the software NIC 124 can hide or prevent direct access to the vNICs by the guest OSs 122 so that the software NIC 124 appears to be the only network interface device available to the VM 120A. In these situations, the guest OS 122A would not detect either vNIC 126A or vNIC 126B as independently accessible devices when they are connected to the software NIC 124. In other cases, some guest OS s 122A can support detecting vNIC 126A and vNIC 126B even when they are bound to the software NIC 124.

Each of the vNICs 126A-B can have a media access control (MAC) address assigned to them by the hypervisor. In some implementations, the MAC addresses of the vNICs 126A-B can be initially determined by the VM 120A (e.g., by using the networking management component 123) and thereafter modified. For example, the MAC addresses that are to be assigned to both the primary vNIC 126A and the standby vNIC 126B can be initially generated by the hypervisor and recorded in a control register of the standby vNIC 126B. In some implementations, the networking management component 123 of VM 120A can read a control register of the standby vNIC 126B to determine the MAC address of the primary vNIC 126A. Similarly, the networking management component 123 of VM 120A can read a control register of the standby vNIC 126B to determine the MAC address of the standby vNIC 126B. In some implementations, the control register of the standby vNIC 126B can further contain another MAC address that can be assigned to the software NIC. Such implementations can be beneficial in cases where it is desirable to have a different MAC address for each of the two vNICs 126A-B and a software NIC 124. Furthermore, additional MAC addresses stored in the control register of the standby vNIC 126B can be used to assign MAC addresses to additional vNICs that might be created or exposed to the VM 120A in the future.

Accordingly, in some implementations the networking management component 123 can execute a software NIC 124 to perform the functions of network data packet communication and assign to it a MAC address that is found in control register of the standby vNIC 126B. Additionally, the networking management component 123 can reassign the MAC addresses of the primary vNIC 126A and the standby vNIC 126B. For example, after initially determining the MAC addresses of the primary vNIC 126A and the standby vNIC 126B by reading the control register of the standby vNIC 126B, the networking management component 123 can assign the MAC address of the software NIC to either the primary vNIC 126A or the standby vNIC 126B. Accordingly, in some implementations, the networking management component 123 can select one of the vNICs 126A-B and assign the software NIC's MAC address to the selected vNIC 126A-B so that network data packets addressed to or originating from that MAC address pass through the selected vNIC 126A-B.

Hardware devices 130 can provide hardware resources and functionality for performing computing tasks. Hardware devices 130 can include one or more physical memory devices 132, one or more physical networking devices 133, one or more physical processing devices 134, other computing devices, or a combination thereof. One or more of hardware devices 130 can be split up into multiple separate devices or consolidated into one or more hardware devices. Some of the hardware device shown can be absent from hardware devices 130 and can instead be partially or completely emulated by executable code.

Physical memory devices 132 can include any data storage device that is capable of storing digital data and can include volatile or non-volatile data storage. Volatile data storage (e.g., non-persistent storage) can store data for any duration of time but can lose the data after a power cycle or loss of power. Non-volatile data storage (e.g., persistent storage) can store data for any duration of time and can retain the data beyond a power cycle or loss of power. In one implementation, physical memory devices 132 can be physical memory and can include volatile memory devices (e.g., random access memory (RAM)), non-volatile memory devices (e.g., flash memory, NVRAM), and/or other types of memory devices. In another example, physical memory devices 132 can include one or more mass storage devices, such as hard drives, solid state drives (SSD)), other data storage devices, or a combination thereof. In a further example, physical memory devices 132 can include a combination of one or more memory devices, one or more mass storage devices, other data storage devices, or a combination thereof, which can or may not be arranged in a cache hierarchy with multiple levels.

Physical processing devices 134 can include one or more processors that are capable of executing the computing tasks. Physical processing devices 134 can be a single core processor that is capable of executing one instruction at a time (e.g., single pipeline of instructions) or can be a multi-core processor that simultaneously executes multiple instructions. The instructions can encode arithmetic, logical, or I/O operations. In one example, physical processing devices 134 can be implemented as a single integrated circuit, two or more integrated circuits, or can be a component of a multi-chip module (e.g., in which individual microprocessor dies are included in a single integrated circuit package and hence share a single socket). A physical processing device can also be referred to as a central processing unit ("CPU").

Physical networking devices 133 (e.g., network adapters or any other components that can connect a computer system to a computer network) can link the computer system 100 to network 140. In some implementations, physical networking devices 133 can include one or more physical NICs 131A-B. Network 140 can be a public network (e.g., the internet), a private network (e.g., a local area network (LAN), a wide area network (WAN)), or a combination thereof. In one example, network 140 can include a wired or a wireless infrastructure, which can be provided by one or more wireless communications systems, such as a wireless fidelity (WiFi) hotspot connected with the network 140 and/or a wireless carrier system that can be implemented using various data processing equipment, communication towers, etc.

vNICs 126A-B, 127A can be virtual adapters that provide the VMs with virtual interfaces for communicating with other networked devices using specific physical layer and data link layer standards. vNICs 126A-B, 127A can be connected to virtual ports of a virtual switch. The virtual switch may be connected to one or multiple physical networking devices 133 (e.g., network controller interface (NIC)), which can be used to create a bridge connection (via a network bridge) to a separate computer network. The network bridge can be a device that creates a connection between two separate computer networks and uses MAC address information to make decisions regarding forwarding packets. A network bridge may interconnect two local area networks (LANs) together and/or separate network segments.

In some implementations a physical NIC 131A-B or a partition (e.g., a virtual representation of a physical function or port) of a physical NIC 131A-B can be mapped directly to a vNIC 126A-B of a VM 120A. For example, the entirety of or a partition of the physical NIC 131A can be assigned for use exclusively to the VM 120A through the vNIC 126A (i.e., physical NIC 131A can be mapped to vNIC 126A). In some examples, the physical NIC's 131A resources and functions can be divided into multiple partitions each of which represent a separate peripheral component interface express (PCI express) function and appear to VM 120A as a separate physical NIC. In either case, the mapping ensures that that the data packets being transmitted to and from the vNIC 126A are directly transmitted respectively to and from the physical NIC 131A. Additionally, a vNIC of a VM can be indirectly linked to a physical NIC of a host machine through a virtual switch executed by the hypervisor. In this situation, the hypervisor and/or a host machine's OS can pass the data packets to and from the vNIC. For example, vNIC 126B can be a completely virtual device the functionality of which is independent of a presence or absence of any physical NIC. In some implementations, vNIC 126B can transmit and receive network data packets through hypervisor 110. In this case, the hypervisor 110 can determine where to direct the packets. For example, the hypervisor can pass the network data packets to vNIC 127A if they are addressed to VM 120B. In another example, the hypervisor 110 can pass the network data packets received from vNIC 126B to one of the physical NICs 131A-B. Similarly, the hypervisor can pass network data packets received from either the physical NICs 131A-B or a vNIC such as vNIC 127 and pass them on to vNIC 126B.

In some implementations, by using the virtual machine management component 112 the hypervisor 110 can create one or more VMs 120A-B to run on the host machine (i.e., computer system 100). Similarly, the hypervisor 110 can create one or more vNICs (e.g., in response to a request by one of the VMs 120A-B). In some implementations, by mapping the address ranges of the configuration space and memory buffers of the vNICs 126A-B, 127 to the address space of the VM 120A-B, the hypervisor 110 can expose the VM 120A-B to a corresponding vNIC 126A-B, 127. For example, the hypervisor 110 can create vNIC 126A and expose it to VM 120A (e.g., by executing and presenting an abstraction of the physical resources and functions of a NIC to the VM 120) so that it can be used as a primary vNIC. Additionally, the hypervisor 110 can similarly create vNIC 126B and expose it to VM 120A so that it can be used as a standby vNIC. In some implementations, the hypervisor can record one or more MAC addresses in the control register of one of the vNICs (e.g., the primary vNIC 126A or standby vNIC 126B) that can be read by the VM or one of its components (e.g., software NIC 124, networking management component 123). The MAC addresses recorded in the control register of one of the vNICs 126A-B can be initially assigned to one of the vNICs 126A-B when they are created or read later (e.g., by a guest OS 122A, networking management component 123, or software NIC) to determine the MAC address of a vNIC 126A-B. Accordingly, in this manner the hypervisor 110 can configure VM 120A with vNICs that the networking management component 123 or software NIC 124 can select to be a primary vNIC 126A and a standby vNIC 126B. The MAC addresses of both the primary vNIC 126A and the standby vNIC 126B can be recorded in the control register of the standby vNIC 126B. In some implementations, the hypervisor can record, in the control register of the standby vNIC 126B, additional MAC addresses that can be used for other vNICs or software NICs.

For example, in some implementations, the networking management component 123 can include selections, that are detectable by the VM 120A, that indicate whether a vNIC is set to be a primary vNIC 126A or a standby vNIC 126B. Thus, a VM 120A can detect (e.g., based on a selection made via the networking management component 123) a primary vNIC 126A configured with a first MAC address assigned to the VM 120A by the hypervisor 110 running on a host computer system 100. Similarly, the VM 120A can detect a standby vNIC 126B configured with a second MAC address. The VM 120A can create (e.g., via the networking management component 123) a software NIC 124 configured with a third MAC address to manage and control the communication of network data packets to and from the VM 120A. In some implementations, each of the first MAC address, second MAC address, and third MAC address can be identified by the VM 120A by reading the control register of the standby vNIC 126B where they can be recorded. Having created the software NIC 124, the VM 120A can connecting the software NIC 124 with the primary vNIC 126A and the standby vNIC 126B and connect the vNICs together by selecting them through the networking management component 123. In this context, connecting can refer to associating the software NIC 124 with the primary vNIC 126A and the standby vNIC 126B such that the software NIC 124 controls and manages all the functions of both the primary vNIC 126A and the standby vNIC 126B (i.e., the software NIC executes and manages all of the functions, including network data packet communication functions, the primary vNIC 126A and the standby vNIC 126B). For example, once bound to the primary vNIC 126A and the standby vNIC 126B, the software NIC 124 can control which vNIC 126A-B is used to transmit network data packets from and receive network data packets for the VM 120A. Further, in some implementations, once bound to the primary vNIC 126A and the standby vNIC 126B, the software NIC 124 can appear to the guest OS 122A of the VM 120A as the only available network interface device.

Accordingly, in some implementations, the VM 120A can determine (e.g., by using the networking management component 123) the respective MAC addresses of the vNICs 126A-B and of the software NIC 124 (e.g., the first MAC address, the second MAC address, and/or the third MAC address) by reading a control register of the standby vNIC 126B. As noted above, the software NIC 124 can control which vNIC 126A-B is used to communicate network data packets. Accordingly, the VM 120A can select one of the vNICs among the primary vNIC 126A and the standby vNIC 126B for use by the software NIC 124 for communicating network data packets.

Initially, each of the vNICs 126A-B and the software NIC 124 can have different MAC addresses assigned to them. In some implementations, when the hypervisor 110 exposes the vNICs to the VM 120A, the hypervisor can configure the vNICs 126A-B with different MAC addresses and provide the MAC addresses to the VM 120A by recording them in a control register of one of the vNICs 126A-B (e.g., control register of the standby vNIC 126B) exposed to the VM 120A. In some implementations, the VM 120A can retrieve the MAC addresses from the control register of one of the vNICs 126A-B and assign the MAC addresses to one or more vNICs 126A-B as well as to the software NIC 124. Similarly, the VM 120A can change or reassign the MAC addresses of the vNICs 126A-B and the software NIC 124. Accordingly, by reading a control register of one of the vNICs 126A-B, the VM 120A can identify one or more MAC addresses and assign them respectively to vNICs 126A-B and the software NIC 124 as well as reassign a MAC address from one of those virtual devices to another. Similarly, in some implementations, the VM 120A can assign the same address to more than one of the virtual devices. For example, the VM 120A can assign the same MAC address to one of the vNICs 126A-B and the software NIC 124 or even to both of the vNICs 126A-B. In some implementations, the VM 120A can select a MAC address from a pre-determined set of MAC addresses (e.g., those recorded in a control register of one of the vNICs 126A-B) or freely assign any other MAC address to any of those virtual devices.

Accordingly, in some implementations, such as those where multiple MAC addresses are recorded in a control register of one of the vNICs 126A-B, a first MAC address can be initially assigned to the primary vNIC 126A, a second MAC address can be initially assigned to the standby vNIC 126B, and a third MAC address can be initially assigned to the software NIC 124. In some cases, the VM 120A can (e.g., by using the networking management component 123) select one of the vNICs 126A-B for the software NIC 124 to use to communicate network data packets to and from the VM 120A. Having selected one of the vNICs 126A-B, the VM 120A can assign the third MAC address to the selected vNIC 126A-B (e.g., primary vNIC 126A), either as a new MAC address or as a replacement for a previously assigned MAC address for the selected vNIC 126A-B. In this manner, the software NIC 124 and, for example, the primary vNIC 126A selected by the VM 120A can both have the same MAC address. Accordingly, by controlling the primary vNIC 126A, the software NIC 124 can transmit network data packets from that MAC address (i.e., the MAC address assigned to both of the primary vNIC and the software NIC 124) and receive network data packets addressed to that MAC address on behalf of the VM 120A.

In some implementations, the VM 120A can (e.g., by using the networking management component 123) select a different vNIC 126A-B (i.e., either the primary vNIC or the standby vNIC) other than the one that was previously selected for communicating network data packets to and from the VM 120A. Accordingly, the VM 120A (e.g., through the networking management component 123) can reassign to the other vNIC 126A-B, the MAC address that was initially assigned to the software NIC 124 and the previously selected vNIC 126A-B. For example, consider a scenario where initially the VM 120A selects the standby vNIC 126B, which was initially configured with MAC address 9a:9f:40:04:b4:a1, for use by the software NIC 124, which was initially configured with MAC address b8:15:0c:d0:87:bd, to communicate network data packets for VM 120A. In this case, the VM 120A can assign MAC address b8:15:0c:d0:87:bd to the standby vNIC 126B instead of its original MAC address 9a:9f:40:04:b4:a1. Further, in the same case, at a later time, the VM 120A can select primary vNIC 126A, which was originally configured with MAC address 10:16:0b:54:df:a0, for use by the software NIC 124 to communicate network data packets for VM 120A. Accordingly, the VM 120A can assign MAC address b8:15:0c:d0:87:bd (i.e., the MAC address with which the software NIC 124 was initially configured) to the primary vNIC 126A instead of its original MAC address 10:16:0b:54:dfa0. Therefore, in some implementations, VM 120A can freely reassign the MAC address of whichever vNIC 126A-B is selected for use by the software NIC 124 to transmit and receive network data packets for VM 120A.

Having selected a vNIC 126A-B that is controlled by software NIC 124, the VM 120A can communicate network data packets through the software NIC 124 using a MAC address that is assigned to both the software NIC 124 and the selected vNIC 126A-B. Similarly, in some implementations, whenever a different vNIC 126A-B is selected, it's MAC address can be changed to the address that was initially assigned to the software NIC 124 and used to transmit and receive network data packets for the VM 120A.

In this manner, the various implementations of this disclosure present a single MAC address at any particular time that is used by a software NIC 124 of VM 120A for network data packet communication. Having freely reassignable MAC addresses for multiple vNICs 126A-B that are controlled by the software NIC 124 allows switching between the vNICs 126A-B without creating ambiguities or inconsistencies from the perspective of a physical NIC 131A-B of the host machine (i.e., computer system 100) with respect to determining which MAC address and which corresponding device to direct network data packets that are intended to be received by the VM 120A.

In some implementations, if the hypervisor 110 exposes N vNICs 126A-B to VM 120A, it can provide N+1 MAC addresses (e.g., by recording them in the control register of one of the vNICs 126A-B) to the guest OS 122A such that MAC addresses 1 through N are respectively assigned to the N vNICs 126A-B and, if the guest OS 122A can bind a software NIC 124 to the vNICs 126A-B, MAC address N+1 is assigned to the software NIC. Then, the MAC address N+1 can be reassigned to replace the MAC address of a vNIC 126A-B when it is selected for use by the software NIC 124. This further facilitates the operation of VMs 120A-B with guest OSs 122A-B which do not support failover functionality implemented by software NIC 124 control of multiple vNICs 126A-B since the vNICs 126A-B are originally configured with different MAC addresses and, therefore, ensure that no ambiguities or inconsistencies arise for directing network data packets to and from the VM 120A via a particular MAC address. These and other features of the implementations of the present disclosure are described in more detail with reference to FIGS. 2 and 3.

Figure 2:
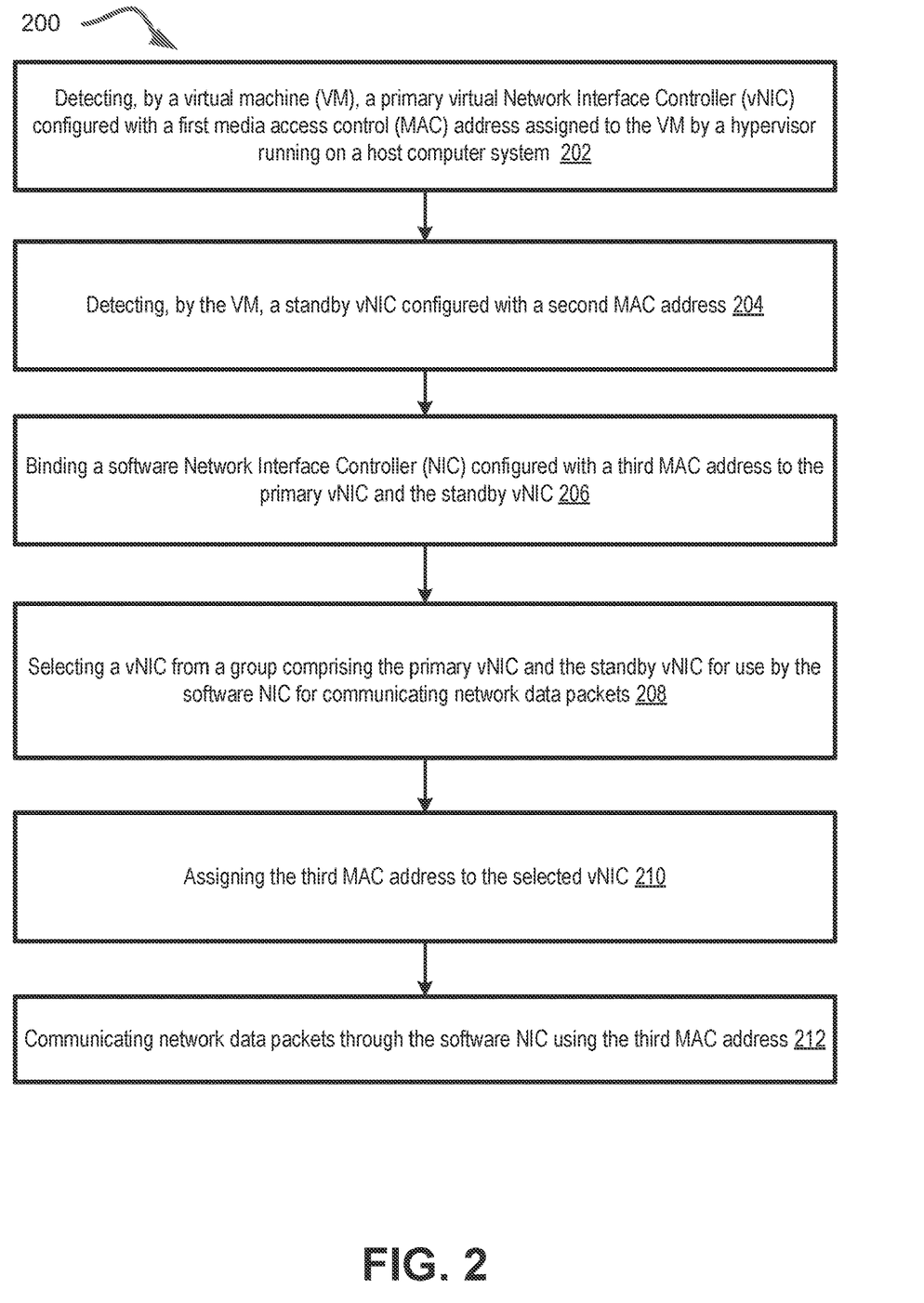
FIG. 2 is a flow diagram of an example method of virtual networking device failover management, in accordance with one or more implementations of the present disclosure.

FIG. 2 is a flow diagram of an example method of virtual networking device failover management, in accordance with one or more aspects of the present disclosure. Method 200 can be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations can be performed by one or more processors of a computer system (e.g., the computer system 100 of FIG. 1) implementing the method. In an illustrative example, method 200 may be performed by a single processing thread. Alternatively, method 200 can be performed by two or more processing threads, each thread implementing one or more individual functions, routines, subroutines, or operations of the method. In an illustrative example, the processing threads implementing method 200 can be synchronized (e.g., using semaphores, critical sections, or other thread synchronization mechanisms). Alternatively, the processing threads implementing method 200 can be executed asynchronously with respect to each other. Therefore, while FIG. 2 and the associated description lists the operations of method 200 in certain order, various implementations of the method can perform at least some of the described operations in parallel or in arbitrary selected orders.

In some implementations, at block 202, the processing logic can detect one or more vNICs exposed and assigned to a VM by a hypervisor. For example, at block 202, the processing logic (e.g., the processing logic associated with VM 120A and networking management component 123 of FIG. 1) can detect a primary vNIC configured with a first MAC address assigned to the VM by a hypervisor running on a host computer system. Similarly, at block 204, the processing logic can detect a standby vNIC configured with a second MAC address.

Having detected multiple vNICs, the processing logic can create a software NIC with a third MAC address to connect the vNICs together (e.g., based on selections made via the networking management component 123) and control their operation for the VM. For example, at block 206, the processing logic can bind a software NIC configured with a third MAC address to the primary vNIC and the standby vNIC.

Using the software NIC, the processing logic can control the primary vNIC and the standby vNIC for communicating network data packets to and from the VM. Accordingly, at block 208, the processing logic can select a vNIC from the group of vNICs that were detected (e.g., the primary vNIC and the standby vNIC) for use by the software NIC for communicating network data packets. Having selected one of the vNICs at block 208, the processing logic can, at block 210, assign a different MAC address to the selected vNIC. For example, at block 208, the processing logic can assign the third MAC address (i.e., the MAC address of the software NIC) to the selected vNIC. At this point, both the software NIC (which from the perspective of the VM can be the exclusive device that controls network data communication for the VM) and the selected vNIC should have the same MAC address. Thus, in some implementations, the processing logic can then, at block 212, communicate (i.e., transmit and receive) network data packets through the software NIC and the selected vNIC using the third MAC address. However, in other implementations, the processing logic can perform additional or alternative operations such as those explained in more detail below with reference to FIG. 3.

Figure 3:
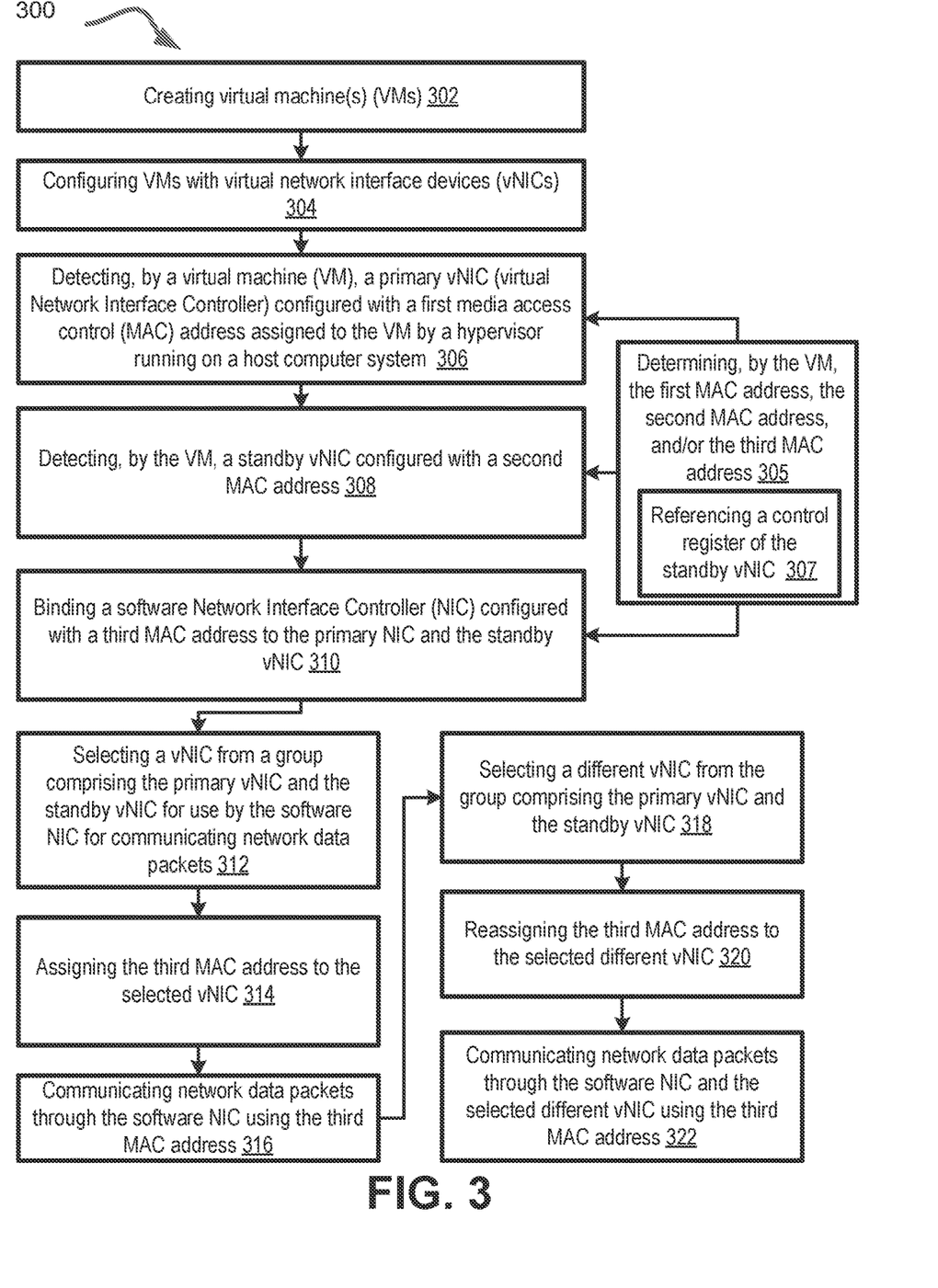
FIG. 3 is a flow diagram of an example method of virtual networking device failover management, in accordance with one or more implementations of the present disclosure.

FIG. 3 is a flow diagram flow diagram of an example method of virtual networking device failover management, in accordance with one or more aspects of the present disclosure. Method 300 can be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations can be performed by one or more processors of a computer system (e.g., the computer system 100 of FIG. 1) implementing the method. In an illustrative example, method 300 can be performed by a single processing thread. Alternatively, method 300 can be performed by two or more processing threads, each thread implementing one or more individual functions, routines, subroutines, or operations of the method. In an illustrative example, the processing threads implementing method 300 can be synchronized (e.g., using semaphores, critical sections, or other thread synchronization mechanisms). Alternatively, the processing threads implementing method 300 can be executed asynchronously with respect to each other. Therefore, while FIG. 3 and the associated description lists the operations of method 300 in certain order, various implementations of the method can perform at least some of the described operations in parallel or in arbitrary selected orders. Events and operations occurring within the various blocks of method 300 can occur, in some implementations, in any order as well as together with or instead of events and operations described with reference to the various blocks of method 200 of FIG. 2.

In some implementations, the processing logic can execute a hypervisor and can create one or more VMs and expose various virtual devices to those VMs. For example at block 302, the processing logic (e.g., via the hypervisor) can create one or more VMs to run on a host machine. The processing logic can then, at block 304, configure the VMs with one or more vNICs and provide to the guest OSs of the VMs the MAC addresses initially assigned to each of the respective vNICs. For example, the processing logic can provide the MAC addresses to the VM by storing MAC addresses in a control register of one of the vNICs (e.g., of a standby vNIC).

In some implementations, at block 306, the processing logic can detect one or more vNICs exposed and assigned to a VM by a hypervisor. For example, at block 306, the processing logic (e.g., the processing logic associated with VM 120A and networking management component 123 of FIG. 1) can detect a primary vNIC configured with a first MAC address assigned to the VM by a hypervisor running on a host computer system. Similarly, at block 308, the processing logic can detect a standby vNIC configured with a second MAC address. Having detected multiple vNICs, the processing logic can create a software NIC with a third MAC address to bind the vNICs together and control their operation for the VM. For example, at block 310, the processing logic can bind a software NIC configured with a third MAC address to the primary vNIC and the standby vNIC.

In some implementations, upon detecting a vNIC, the processing logic can determine a corresponding MAC address that should be assigned to the vNIC. Similarly, upon creating a software NIC the processing logic can determine a corresponding MAC address that should be assigned to the software NIC. The determination of a corresponding MAC address can include reading a control register of one of the vNICs where one or more MAC addresses can be recorded (e.g., by the hypervisor). Accordingly, in some implementations, upon the detection of a primary vNIC at block 306, the detection of a standby vNIC at block 308, and/or the creation of the software NIC at block 310, the processing logic can at block 305 determine a corresponding MAC address for each of those devices (i.e., a first MAC address for the primary vNIC, a second MAC address for the standby vNIC, and a third MAC address for the software NIC). The processing logic determining, at block 305, the first, second, and/or third MAC addresses can include the processing logic reading a control register of one of the vNICs (e.g., of the primary vNIC or the standby vNIC) where the MAC addresses are recorded.

Using the software NIC, the processing logic can control the primary vNIC and the standby vNIC for communicating network data packets to and from the VM. Accordingly, at block 312, the processing logic can select a vNIC from the group of vNICs that were detected (e.g., the primary vNIC and the standby vNIC) for use by the software NIC for communicating network data packets. Having selected one of the vNICs (e.g., the primary vNIC) at block 312, the processing logic can, at block 314, assign a different MAC address to the selected vNIC than the one with which it was originally configured. For example, at block 314, the processing logic can assign the third MAC address (i.e., the MAC address of the software NIC) to the selected vNIC. At this point, both the software NIC (which from the perspective of the VM can be the exclusive device that controls network data communication for the VM) and the selected vNIC should have the same MAC address. Thus, in some implementations, the processing logic can then, at block 316, communicate (i.e., transmit and receive) network data packets through the software NIC and the selected vNIC using the third MAC address.

In some implementations, the processing logic can have the software NIC switch the vNICs that are used for communicating the network data packets. For example, at block 318, the processing logic can select a different vNIC (e.g., the standby vNIC) from the group of vNICs that were detected (e.g., the primary vNIC and the standby vNIC) for use by the software NIC for communicating network data packets. Having selected a different vNIC at block 318, the processing logic can, at block 320, assign a different MAC address to the selected vNIC. For example, at block 320, the processing logic can reassign the third MAC address (i.e., the MAC address of the software NIC) to the newly selected vNIC. Accordingly, in some implementations, the processing logic can restore the previously selected vNIC to have its originally assigned original MAC address and replace the originally assigned MAC address of the newly selected vNIC with the Mac address of the software NIC. For example having previously, at block 314, assigned the third MAC address to the primary vNIC (instead of its original first MAC address), at block 320, the processing logic can restore the primary vNIC so that it is assigned its original MAC address and assign the third MAC address to the standby NIC (instead of its original second MAC address). At this point, both the software NIC (which from the perspective of the VM can be the exclusive device that controls network data communication for the VM) and the newly selected vNIC should have the same MAC address. Thus, in some implementations, the processing logic can then, at block 322, communicate (i.e., transmit and/or receive) network data packets through the software NIC and the newly selected vNIC using the third MAC address. The determination of the MAC addresses to each of the vNICs and the software NIC can be further understood with reference to the components shown in FIG. 4 and the details provided below.

Figure 4:
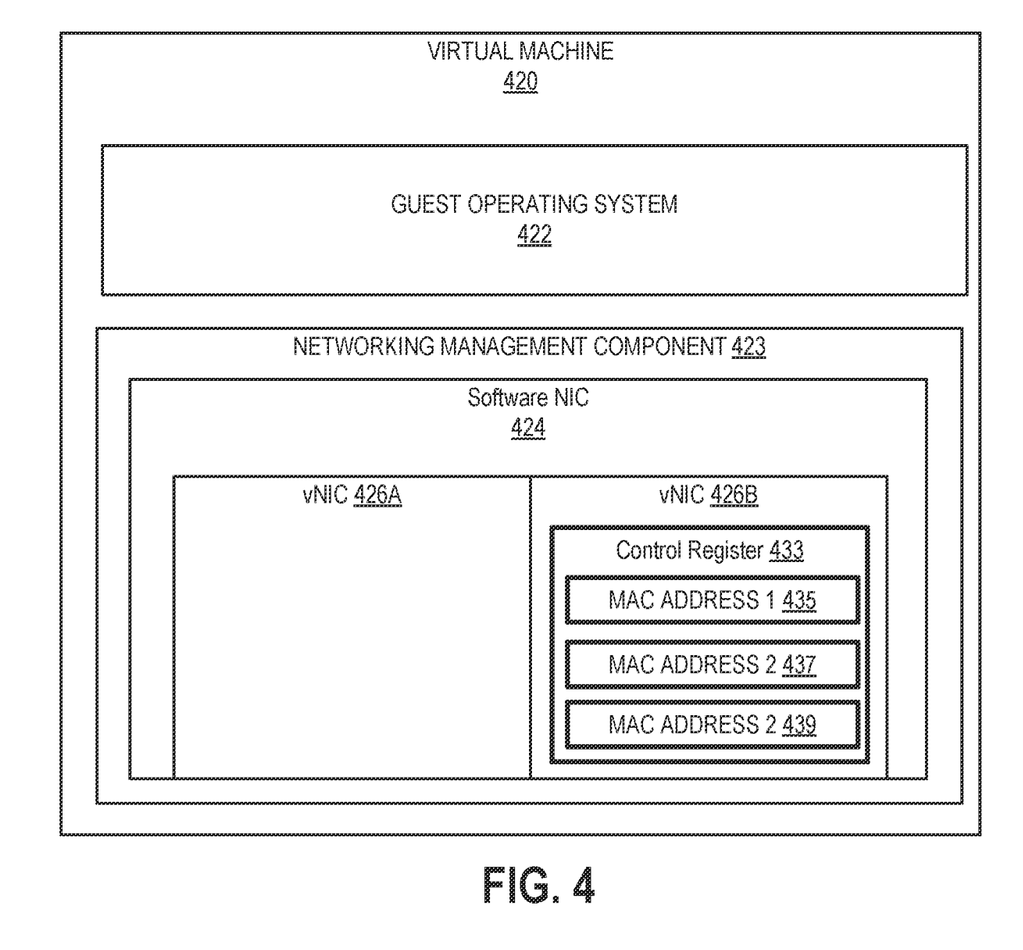
FIG. 4 depicts a high-level diagram of an example virtual machine, in accordance with one or more implementations of the present disclosure.

FIG. 4 shows an example VM 420, in accordance with one or more implementations of the present disclosure. In some implementations, the VM 420 can be analogous to the VM 120A created by the hypervisor 110 of FIG. 1. The VM 420 can include a guest OS 422 that can be integrated with a networking management component 423 to manage networking operations for the VM 420.

In some implementations, the VM 420 can be configured with (i.e., provided access to) one or more vNICs 426A-B. For example, the network management component 423 can receive access to vNIC 426A (also referred to as a "primary vNIC") and to vNIC 426B (also referred to as a "standby vNIC") and manage their operation. The networking management component 423 can be a software component implemented by one or more software modules, each module associated with a set of executable instructions. In some implementations, the networking management component 423 can be purely functional (i.e., networking management component 423 can be an integral part of the executable code of VM 420). In some implementations, the networking management component 423 can be a component of guest OS 422.

In some implementations, the VM 420 include a software NIC 424 (e.g., as part of the networking management component 423) which can control the operation of the primary vNIC 426A and standby vNIC 426B and function as the exclusive means for communicating network data packets for VM 420. The software NIC 424 can bind and manage the vNICs 426A-B as a pair of vNICs that act as failover devices for one another when a loss of functionality is experienced. For example, the software NIC 424 can control the operation of the primary vNIC 426A and standby vNIC 426B so that for some guest OSs 422, it appears that the software NIC 424 is the only network interface device available to the VM 420. Accordingly, in some implementations, the guest OS 422 does not detect either vNIC 426A or vNIC 426B when they are bound to the software NIC 424. In other implementations, the guest OS 422 can detect vNIC 426A and vNIC 426B even when they are bound to the software NIC 424.

Each of the vNICs 426A-B can have a MAC address assigned to them (e.g., by a hypervisor or by the networking management component 423). In some implementations, one or more MAC addresses 435, 437, 439, can be recorded in a control register 433 of the standby vNIC 426B. In some cases, the networking management component 423 can determine what the MAC addresses initially assigned to vNIC 426A and vNIC 426B are and can then modify them. For example, the control register 433 of the standby vNIC 426B can include a first MAC address 435, a second MAC address 437, and a third MAC address 439. In some implementations, one of the MAC addresses (e.g., the third MAC address 439) recorded in the control register 433 of the standby vNIC 426B can be assigned to the software NIC.

Thus, in some implementations, the networking management component 423 can determine the MAC addresses that are to be assigned to both the primary vNIC 426A and the standby vNIC 426B that were initially generated by a hypervisor and recorded in a control register 433 of the standby vNIC 426B. For example, the networking management component 423 of VM 420 can read the control register 433 of the standby vNIC 426B to determine the first MAC address 435 for the primary vNIC 426A. Similarly, the networking management component 423 of VM 420 can read the control register 433 of the standby vNIC 426B to determine the MAC address 437 for the standby vNIC 426B.

Accordingly, in some implementations, the networking management component 423 can create a software NIC 124 and assign to it a MAC address (e.g., the third MAC address 439) that is found in control register of the standby vNIC 426B. Additionally, the networking management component 423 can freely reassign the MAC addresses of the primary vNIC 426A and the standby vNIC 426B. For example, after initially determining the first MAC address 425 for the primary vNIC 426A and the second MAC address 437 for the standby vNIC 426B by reading the control register 433, the networking management component 423 can assign the third MAC address 439 to either the primary vNIC 426A or the standby vNIC 426B. Accordingly, in some implementations, the networking management component 423 can select one of the vNICs 426A-B and replace its MAC address (e.g., first MAC address 435 or second MAC address 437) with the third MAC address 439 (i.e., the one originally assigned to the software NIC 424) so that network data packets addressed to or originating from that third MAC address 439 pass through the selected vNIC 126A-B and the software NIC 424 (since it would still also have the third MAC address 439 assigned to it as well).

Figure 5:
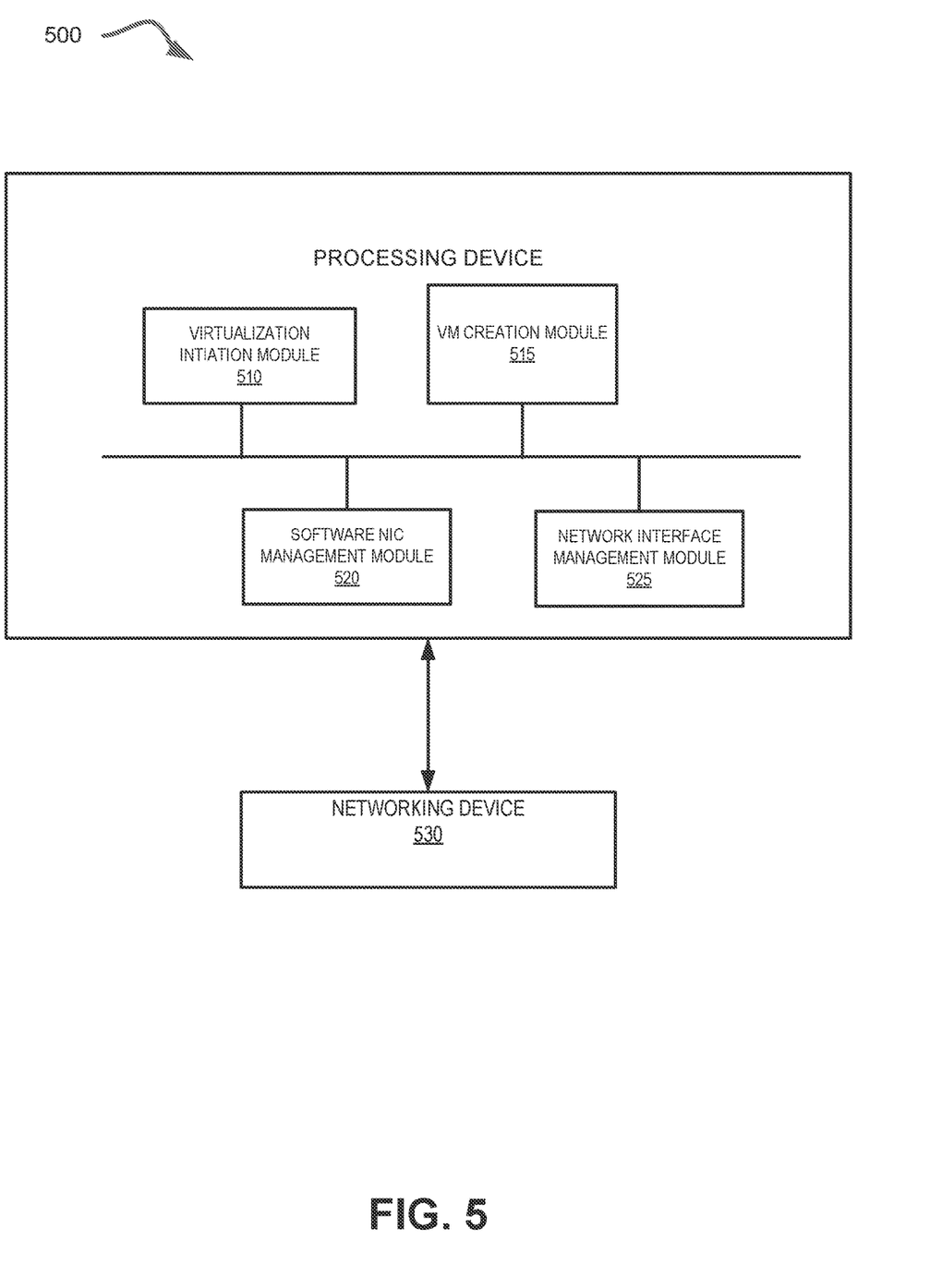
FIG. 5 depicts a block diagram of a computer system operating in accordance with one or more implementations of the present disclosure.

FIG. 5 depicts a block diagram of a computer system 500 operating in accordance with one or more aspects of the present disclosure. Computer system 500 can be the same or similar to computer system 100 of FIG. 1 or computer system 600 of FIG. 6 and can include one or more processing devices and one or more networking devices. In the example shown, computer system 500 may include a virtualization initiation module 510, a VM creation module 515, a software NIC management module 520, a network interface management module 525, and a networking device 530.

In some implementations, the virtualization initiation module 510 can enable the processing device (e.g., a processor) to run a hypervisor to manage one or more virtual machines. The VM creation module 515 can enable the processor to create and manage one or more virtual machines and provision each of them with one or more guest software environments optionally including an operating system and application software. In some implementations, the VM creation module 515 can enable the processor to create and manage one or more VMs. For example, the VM creation module 515 can enable the processor to create a VM and allocate computing resources such as virtual devices including one or more vNICs.

Software NIC management module 520, can enable the processor to create a software NIC to manage and control the operation of one or more vNICs. In some implementations, software NIC management module 520 can enable the processor to configure the software NIC as an exclusive device for network packet data communication from and to the VM. In some implementations, the network interface management module 525 enable the processor to create and manage one or more vNICs in one or more respective VMs. In some implementations, the software NIC management module 520 can assign MAC addresses to the software NIC and/or to one or more vNICs by accessing a control register of one of the vNICs where one or more MAC addresses can be stored by the VM creation module 515.

The network interface management module 525 can enable the processor to virtualize the networking resources of the networking device and manage the receipt and transmission of network data packets from and to each of the vNICs. In some implementations, the network interface management module 525 enable the processor to create and manage one or more vNICs in one or more respective VMs. In some implementations, the network interface management module 525 can map a vNIC of a VM directly to a physical networking device 530 (e.g., by having a partition of the physical networking device 530 assigned exclusively to the VM and associated to resources represented by the vNIC) such that the data packets being transmitted to and from the vNIC are directly transmitted to and from the physical networking device 530.

Figure 6:
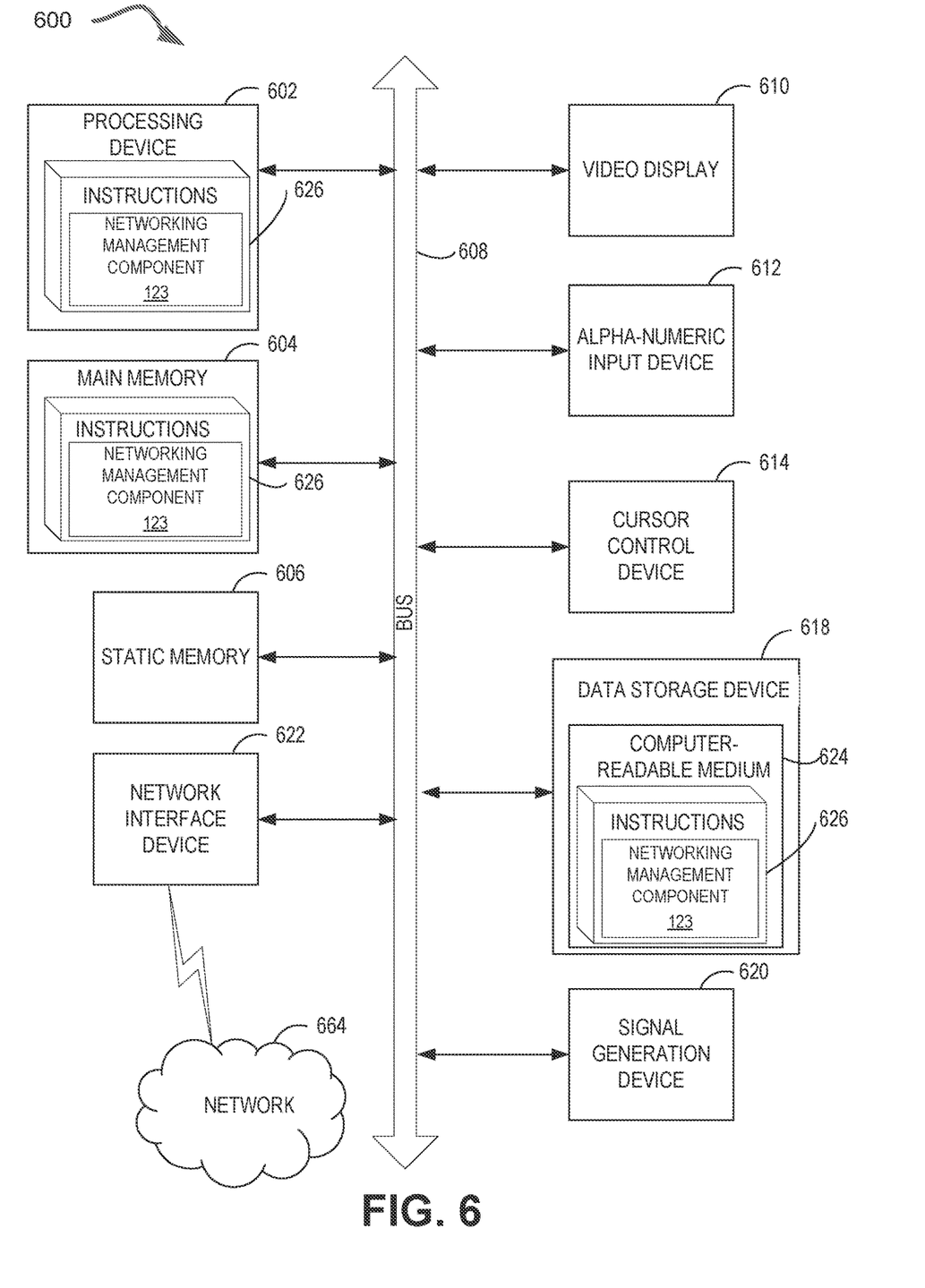
FIG. 6 depicts a block diagram of an illustrative computing device operating in accordance with one or more implementations of the present disclosure.

FIG. 6 depicts a block diagram of a computer system operating in accordance with one or more aspects of the disclosure. In various illustrative examples, computer system 600 can correspond to computer system 100 of FIG. 1. The computer system 600 can be included within a data center that supports virtualization. Virtualization within a data center results in a physical system being virtualized using VMs and/or containerized applications to consolidate the data center infrastructure and increase operational efficiencies. A VM can be a program-based emulation of computer hardware. For example, the VM can operate based on computer architecture and functions of computer hardware resources associated with hard disks or other such memory. The VM can emulate a physical computing environment, but requests for a hard disk, memory, or networking resources can be managed by a virtualization layer of a host system to translate these requests to the underlying physical computing hardware resources. This type of virtualization results in multiple VMs sharing physical resources.

In certain implementations, computer system 600 can be connected (e.g., via a network, such as a Local Area Network (LAN), an intranet, an extranet, or the Internet) to other computer systems. Computer system 600 can operate in the capacity of a server or a client computer in a client-server environment, or as a peer computer in a peer-to-peer or distributed network environment. Computer system 600 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 can include a processing device 602, a volatile memory 604 (e.g., random access memory (RAM)), a non-volatile memory 606 (e.g., read-only memory (ROM) or electrically-erasable programmable ROM (EEPROM)), and a data storage device 618, which can communicate with each other via a bus 608.

Processing device 602 can be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 can further include a network interface device 622. Computer system 600 also can include a video display unit 610 (e.g., an LCD), an alphanumeric input device 612 (e.g., a keyboard), a cursor control device 614 (e.g., a mouse), and a signal generation device 616.

Data storage device 618 can include a non-transitory computer-readable storage medium 624 which can store instructions 626 embodying any one or more of the methodologies or functions described herein (e.g., networking management component 123 of FIG. 1, and methods 200 and 300 of FIGS. 2 and 3, respectively). Instructions 626 can also reside, completely or partially, within volatile memory 604 and/or within processing device 602 during execution thereof by computer system 600, hence, volatile memory 604, and processing device 602 can also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods 200, and 300, and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   detecting, by a virtual machine (VM), a primary virtual Network Interface Controller (vNIC) configured with a first media access control (MAC) address assigned to the VM by a hypervisor;
   detecting, by the VM, a standby vNIC configured with a second MAC address;
   recording the first MAC address and the second MAC address in a control register of the standby vNIC;
   connecting a software Network Interface Controller (NIC) configured with a third MAC address to the primary vNIC and the standby vNIC;
   selecting a vNIC represented by one of: the primary vNIC or the standby vNIC;
   assigning the third MAC address to the selected vNIC; and
   communicating network data packets through the software NIC using the third MAC address.

2. The method of claim 1, further comprising:
   determining, by the VM, one of: the first MAC address, the second MAC address, or the third MAC address by reading the control register of the standby vNIC.

3. The method of claim 1, further comprising:
   selecting a different vNIC represented by one of: the primary vNIC or the standby vNIC;
   reassigning the third MAC address to the selected different vNIC; and
   communicating the network data packets through the software NIC and the selected different vNIC using the third MAC address.

4. The method of claim 1, wherein the primary vNIC is associated with a physical NIC of a host computer system.

5. The method of claim 1, wherein the third MAC address is identical to one of: the first MAC address or the second MAC address.

6. The method of claim 1, wherein communicating network data packets comprises at least one of: transmitting network data packets to a physical NIC of a host computer system or receiving the network data packets from the physical NIC of the host computer system.

7. The method of claim 1, wherein communicating network data packets comprises transmitting the network data packets to or receiving the network data packets from the hypervisor.

8. A system comprising:
a memory device;
a processing device operatively coupled to the memory device, to:
detect, by a virtual machine (VM), a primary virtual Network Interface Controller (vNIC) configured with a first media access control (MAC) address assigned to the VM by a hypervisor;
detect, by the VM, a standby vNIC configured with a second MAC address;
record the first MAC address and the second MAC address in a control register of the standby vNIC;
connect a software Network Interface Controller (NIC) configured with a third MAC address to the primary vNIC and the standby vNIC;
select a vNIC represented by one of: the primary vNIC or the standby vNIC;
assign the third MAC address to the selected vNIC; and
communicate network data packets through the software NIC using the third MAC address.

9. The system of claim 8, wherein the processing device is further to:
determine, by the VM, one of: the first MAC address, the second MAC address, or the third MAC address by reading the control register of the standby vNIC.

10. The system of claim 8, wherein the processing device is further to:
select a different vNIC represented by one of: the primary vNIC or the standby vNIC;
reassign the third MAC address to the selected different vNIC; and
communicate the network data packets through the software NIC and the selected different vNIC using the third MAC address.

11. The system of claim 8, wherein the primary vNIC is associated with a physical NIC of a host computer system.

12. The system of claim 8, wherein the third MAC address is identical to one of:
the first MAC address or the second MAC address.

13. The system of claim 8, wherein, to communicate the network data packets, the processing device is to transmit the network data packets to a physical NIC of a host computer system or receive the network data packets from the physical NIC of the host computer system.

14. The system of claim 8, wherein, to communicate the network data packets, the processing device is to transmit the network data packets to or receive the network data packets from the hypervisor.

15. A non-transitory computer-readable media storing instructions that, when executed, cause a processing device to:
detect, by a virtual machine (VM), a primary vNIC (virtual Network Interface Controller) configured with a first media access control (MAC) address assigned to the VM by a hypervisor;
detect, by the VM, a standby vNIC configured with a second MAC address;
record the first MAC address and the second MAC address in a control register of the standby vNIC;
connect a software Network Interface Controller (NIC) configured with a third MAC address to the primary vNIC and the standby vNIC;
select a vNIC represented by one of: the primary vNIC or the standby vNIC;
assign the third MAC address to the selected vNIC; and
communicate network data packets through the software NIC using the third MAC address.

16. The non-transitory computer-readable media of claim 15, wherein the instructions further cause the processing device to:
determine, by the VM, at least one of: the first MAC address, the second MAC address, or the third MAC address by reading the control register of the standby vNIC.

17. The non-transitory computer-readable media of claim 15, wherein the instructions further cause the processing device to:
select a different vNIC represented by one of: the primary vNIC or the standby vNIC;
reassign the third MAC address to the selected different vNIC; and
communicate the network data packets through the software NIC and the selected different vNIC using the third MAC address.

18. The non-transitory computer-readable media of claim 15, wherein the primary vNIC is associated with a physical NIC of a host computer system.

19. The non-transitory computer-readable media of claim 15, wherein the third MAC address is identical to one of: the first MAC address or the second MAC address.

20. The non-transitory computer-readable media of claim 15, wherein, to communicate the network data packets, the instructions cause the processing device is to transmit the network data packets to a physical NIC of a host computer system or receive the network data packets from the physical NIC of the host computer system.

* * * * *